United States Patent [19]

Danieli et al.

[11] Patent Number: 5,977,951
[45] Date of Patent: Nov. 2, 1999

[54] SYSTEM AND METHOD FOR SUBSTITUTING AN ANIMATED CHARACTER WHEN A REMOTE CONTROL PHYSICAL CHARACTER IS UNAVAILABLE

[75] Inventors: Damon Vincent Danieli, Bellevue; Kenneth Ray Robertson, Redmond; Timothy Edward Wood, Seattle, all of Wash.

[73] Assignee: Microsoft Corporation, Redmond, Wash.

[21] Appl. No.: 08/795,698

[22] Filed: Feb. 4, 1997

[51] Int. Cl.$^6$ .............................. G09B 5/06; G09F 19/08; G09G 5/12
[52] U.S. Cl. ........................................ 345/156; 434/307 R
[58] Field of Search ........................ 345/156; 434/307 R, 434/308, 365

[56] References Cited

U.S. PATENT DOCUMENTS

| | | |
|---|---|---|
| 3,493,674 | 2/1970 | Houghton . |
| 3,743,767 | 7/1973 | Bitzer et al. . |
| 3,891,792 | 6/1975 | Kimura . |
| 3,900,887 | 8/1975 | Soga et al. . |
| 3,993,861 | 11/1976 | Baer . |
| 4,186,413 | 1/1980 | Mortimer . |
| 4,207,704 | 6/1980 | Akiyama . |
| 4,540,176 | 9/1985 | Baer . |
| 4,599,644 | 7/1986 | Fischer . |
| 4,660,033 | 4/1987 | Brandt . |
| 4,665,431 | 5/1987 | Cooper . |
| 4,807,031 | 2/1989 | Broughton et al. . |
| 4,840,602 | 6/1989 | Rose . |
| 4,846,693 | 7/1989 | Baer . |
| 4,847,699 | 7/1989 | Freeman . |
| 4,847,700 | 7/1989 | Freeman . |
| 4,864,607 | 9/1989 | Mitamura et al. . |
| 4,930,019 | 5/1990 | Chu . |
| 4,949,327 | 8/1990 | Forsse et al. . |
| 5,021,878 | 6/1991 | Lang . |
| 5,108,341 | 4/1992 | DeSmet . |
| 5,198,893 | 3/1993 | Lang . |
| 5,270,480 | 12/1993 | Hikawa . |
| 5,655,945 | 8/1997 | Jani . |
| 5,733,131 | 3/1998 | Park ................................... 434/307 R |

FOREIGN PATENT DOCUMENTS

WO91/10490  7/1991  WIPO .

*Primary Examiner*—Jeffery Brier
*Attorney, Agent, or Firm*—Jones & Askew, LLP

[57] ABSTRACT

An educational computer system includes a computer, a display device, a remote control character, and a wireless modem for communication between the computer and the remote control character. The remote control character can move and speak in response to signals from the computer, thereby allowing the remote control character to interact with the user and with characters displayed on the display device. When a program is run, the computer determines whether the remote control character is available. If it is not, the computer substitutes an animated character that is displayed on the display device. The computer periodically checks for the remote control characters while displaying the animated character. If the remote control character becomes available, the animated character is discontinued and the computer begins sending voice and movement information to the remote control character. Similarly, if the remote control character becomes unavailable while the program is running, the program will automatically revert to the animated character and the program will continue.

16 Claims, 6 Drawing Sheets

SYSTEM AND METHOD FOR SUBSTITUTING AN ANIMATED CHARACTER WHEN A REMOTE CONTROL PHYSICAL CHARACTER IS UNAVAILABLE

RELATED APPLICATIONS

This application is related to U.S. application Ser. No. 08/794,921 entitled "A SYSTEM AND METHOD FOR CONTROLLING A REMOTE DEVICE" filed on Feb. 4, 1997; U.S. application Ser. No. 08/795,710, entitled "PROTOCOL FOR A WIRELESS CONTROL SYSTEM" filed on Feb. 4, 1997; and U.S. application Ser. No. 08/795,711 entitled "METHOD AND SYSTEM FOR DETERMINING LIP POSITION AND MOUTH OPENING OF AN ANIMATED CHARACTER" filed on Feb. 4, 1997; all assigned to a common assignee and which are incorporated herein by reference.

TECHNICAL FIELD

The present invention relates to a remote control character that interacts with content displayed on a display device, and more particularly relates to an improved system and method for providing a substitute animated character on the display device when the remote control character is unavailable.

BACKGROUND OF THE INVENTION

Microsoft Corporation has developed a product called "REALMATION," which is an educational computer product for young children. The product includes animated educational programs and physical characters ("REALMATION" performers), which are motorized plush toys that move and speak. When the child is using the program, a physical character "comes to life" and interacts with the user and with characters that are displayed on a display device. The physical character acts as a guide or friend to the child and provides assistance, encouragement, and guidance as the child uses the program. The physical character moves and speaks in response to signals that are retrieved from the educational program's storage medium and transmitted to the physical character. The physical character also includes various sensors for receiving input signals from the child.

Because the program content relies on interaction with the physical character, the physical character must be present in order for the software package to provide a satisfactory user experience. In other words, the programmed dialog and the "learning experience" will be incomplete without the involvement of the physical character. Because the physical character is a portable toy that runs on batteries, there will no doubt be times when the physical character will be unavailable. For example, the physical character may be unavailable because it has been moved to another room or its batteries are exhausted.

In one embodiment, the "REALMATION" program causes a computer to determine whether the physical character is available (i.e., in range and operative). If it is not, the computer prompts the user to locate the physical character and to turn it on. If the user does not activate the physical character, the program will not continue. This prevents the program from being used without the physical character, which, in many cases, would provide a less than satisfactory learning experience.

Because it is likely that the physical character will be unavailable from time to time, there is a need in the art for providing a substitute interactive character that will allow the "REALMATION" program to be used effectively despite the absence of the physical character. The system employs a physical character when it is available and provides a substitute character when the physical character is unavailable. The transition from the physical character to the substitute character should be transparent to the user and should maintain the continuity of the lesson or other content provided by the "REALMATION" program.

SUMMARY OF THE INVENTION

The present invention satisfies the above-described needs by providing a system and method for employing both remote control physical characters and substitute animated characters in conjunction with educational programs and other types of software. The physical character interacts with the user and the characters displayed on a display device in order to provide guidance and encouragement to the user. If the physical character is unavailable for some reason, an animated version of the character is displayed on the display device as a substitute for the physical character. By providing the animated character, the present invention ensures that the application/content software continues to be usable and that the user's experience will be satisfactory even if the physical character is unavailable. The animated character is useful because substitution is automatic, and does not require any input from the user.

Generally described, the present invention provides a method for replacing a controlled device (i.e., a physical character) with a representation of the controlled device (i.e., an animated character). When carried out in a system that includes a computer, a display device, and a controlled device that responds to signals from the computer, the method determines whether the controlled device is available. If the controlled device is available, controlled device data is transmitted to the controlled device. If the controlled device is not available, representation data is retrieved and used to display a representation of the controlled device on the display device. The transmitted controlled device data and the retrieved representation data are coordinated with program content being displayed on the display device.

More particularly described, if the system is transmitting controlled device data to the controlled device and receives an indication that the controlled device is no longer available, the system retrieves representation data and displays a representation of the controlled device on the display device. Similarly, if the system is displaying the representation on the display device and receives an indication that the controlled device is now available, the representation is removed from the display device and controlled device data is transmitted to the controlled device.

In another aspect, the present invention provides a computer system for displaying an animated character in the place of a physical character. The computer system includes a physical character, a processing unit, a wireless modem connecting the physical character to the processing unit, a display device, memory, and storage medium for storing content to be displayed on the display device, physical character data, and animated character data. The processing unit is responsive to instructions from the program module and is operative to acquire a physical character. The processing unit displays the content on the display device. Physical character data is retrieved from the storage medium and transmitted to the physical character. In response to an indication that the physical character is not available, the processing unit retrieves animated character data from the storage medium and displays an animated character on the display device. The retrieved portions of the physical character data and animated character data are coordinated with the content being displayed on the display device.

Turning to another aspect, the present invention provides a computer-readable medium having computer-executable instructions for performing various steps. The steps include retrieving content to be displayed on a display device and determining whether a physical character is available. If a physical character is available, animated character data is retrieved and an animated character is displayed on the display device. If the physical character becomes available, the animated character is terminated and physical character data is retrieved from the storage medium and transmitted to the physical characters.

In yet another aspect, the present invention provides, in a distributed processing system, a method of operating a client process for replacing a physical character with an animated character. The method includes retrieving physical character data. A function call is issued to a server process. The function call includes a plurality of call parameters including the physical character data. In response to a message from the server process indicating that the physical character is unavailable, the client process retrieves animated character data and displays an animated character on a display device.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 5, consisting of FIGS. 5a, 5b, and 5c, illustrates the substitution of an animated character for a missing physical character in accordance with an exemplary embodiment of the present invention.

DETAILED DESCRIPTION

The present invention is directed toward a method and system for substituting an animated character or performer during the absence of a physical character or performer. In one embodiment, the invention is incorporated into the "REALMATION" product, which is produced by Microsoft Corporation of Redmond, Washington. Briefly described, the "REALMATION" product primarily relies on an electronic toy (the physical character) that interacts with the user of a computer program. When the electronic toy is absent or inoperative, the "REALMATION" program substitutes an animated character that takes over the role played by the physical toy. The program content (animation, audio, etc.) is stored on suitable storage medium along with the data for controlling the physical toy and the animation data for the substitute character. The program switches back and forth between the two data sources depending on the availability of the physical toy. This allows the program to be used in an effective and satisfying way despite the absence of physical toy.

Referring now to the drawings, in which like numerals represent like elements throughout the several figures, aspects of the present invention and an exemplary operating environment will be described.

EXEMPLARY OPERATING ENVIRONMENT

Aspects of the present invention are described within the context of a system that includes a master device that communicates with and controls one or more slave devices through a radio frequency (RF) communication channel. More specifically, aspects of the present invention are particularly applicable within a "REALMATION" system. "REALMATION," derived from combining the words "realistic" and "animation," is descriptive of a new technology that Microsoft Corporation of Redmond Washington is developing. An example of a "REALMATION" system includes of master device, such as a computer system with a display device, which communicates with and controls one or more slave devices, such as motorized toy characters (the physical characters). The master device provides scenes of an animated audio/video presentation on the display device while simultaneously transmitting control information and speech data to one or more physical characters. The physical characters, in response to receiving the control information and speech data, move and talk in context with the animated audio/video presentation.

Microsoft Corporation is developing a "REALMATION" product that includes two main components: a control system acting as the master device; and one or more physical characters acting as slave devices. The physical characters may include a variety of devices that are useful for industrial, educational, research, entertainment or other similar purposes. Each physical character includes an RF transceiver system for receiving, demodulating, and decoding signals originating from the control system. The signals originating from the control system contain control information and speech data. The RF transceiver within each physical character may also encode, modulate and transmit signals to the control system. These transmitted signals carry status information concerning the physical character to the control system.

The control system governs the operation of one or more physical characters while also presenting an animated audio/video presentation. The control system includes a program data source, a wireless modem, and a display device. The program data source may be an active device, such as computer system, that controls the wireless modem as well as provides the input of program data. Alternatively, the program data source may be combined with the wireless modem to form a "smart" wireless modem. Regardless of the configuration, the program data source provides the input of program data, and the wireless modem transmits the program data to one or more physical characters.

The main function of the wireless modem is to receive program data from the program data source, encode the program data, and transmit the encoded program data to one or more physical characters. In addition, the wireless modem may receive response signals from the physical characters and decode the response signals to recover character data.

Exemplary embodiments of the control system, wireless modem and physical characters will be generally described in the context of programs running on a microprocessor-based computer system. Those skilled in the art will recognize that implementations of the present invention may include various types of program modules, use various programming languages, and be operable with various types of computing equipment. Additionally, although the descriptions of exemplary embodiments portray the control system as controlling a physical character over an RF communication channel, those skilled in the art will appreciate that substitutions to the RF communication channel can include other communication mediums such as fiber optic links, copper wires, infrared signals, etc.

Generally, a program, as defined herein, includes routines, sub-routines, program modules, components, data structures, etc., that perform particular tasks or implement particular abstract data types. Moreover, those skilled in the art will appreciate that aspects of the present invention are applicable to other computer system configurations. These other computer system configurations include but are not limited to hand-held devices, multiprocessor systems, microprocessor-based or programmable consumer electronics, minicomputers, mainframe computers, and the like. Aspects of the present invention are also applicable within the context of a distributed computing environment that includes tasks being performed by remote processing devices that are linked through a communications network. In a distributed computing environment, program modules may be located in both local and remote memory storage devices.

The physical characters are low-cost, electro-mechanical characters intended for providing an interactive learning and entertainment environment for children. At minimum, each physical character includes a receiver system, a speech synthesizer, a speaker, a processing unit, and one or more servo motors. In response to the receiver system receiving program data over the air, the processing unit decodes, interprets, and responds in a manner dictated by the contents of the program data. The response of the processing unit may include actuating one or more servo motors and/or providing input to the speech synthesizer.

The physical characters also include one or more sensor devices and a transmitter system. The sensor devices may detect actions such as a child squeezing the hand, covering the eyes, or changing the position of the physical character. By monitoring output signals from the sensors, the processing unit may collect status information. Upon receiving a request from the control system or by making an autonomous decision, the processing unit can transmit the sensor status information to the control system. In response to receiving the sensor status information, the control system may alter the animated audio/video presentation in a manner commensurate with the information. For example, in response to the action of a child covering the eyes of the physical character, the animated audio/video presentation may switch to a game of peek-a-boo.

Thus, the control system engages in bi-directional communication with one or more physical characters. Although the description of this exemplary embodiment of the control system portrays a program running on a personal computer and cooperating with another program running on a microprocessor-based communication device, those skilled in the art will recognize that other implementations, such as a single program running on a stand-alone platform, or a distributed computing device equipped with radio communication equipment, may also suffice.

The communication between the master and slave devices will be described in the context of RF signal transmissions formed in accordance with amplitude modulation ("AM") techniques. The RF signals are used to transfer symbolic representations of digital information from one device to another. The RF signals are generated by modulating the amplitude of a carrier signal in a predetermined manner based on the value of a symbolic representation of the digital data. It should be understood that a variety of communication technologies may be utilized for transmitting the information between these devices and that describing the use of AM techniques should not restrict the principles of any aspect of the present invention.

Referring now to the drawings, in which like numerals represent like elements throughout the several figures, aspects of the present invention and exemplary operating environments will be described. FIG. 1–FIG. 4, in conjunction with the following discussion, are intended to provide a brief, general description of suitable environments in which the invention may be implemented.

THE PERSONAL COMPUTER BASED CONTROL SYSTEM

Figure 1:
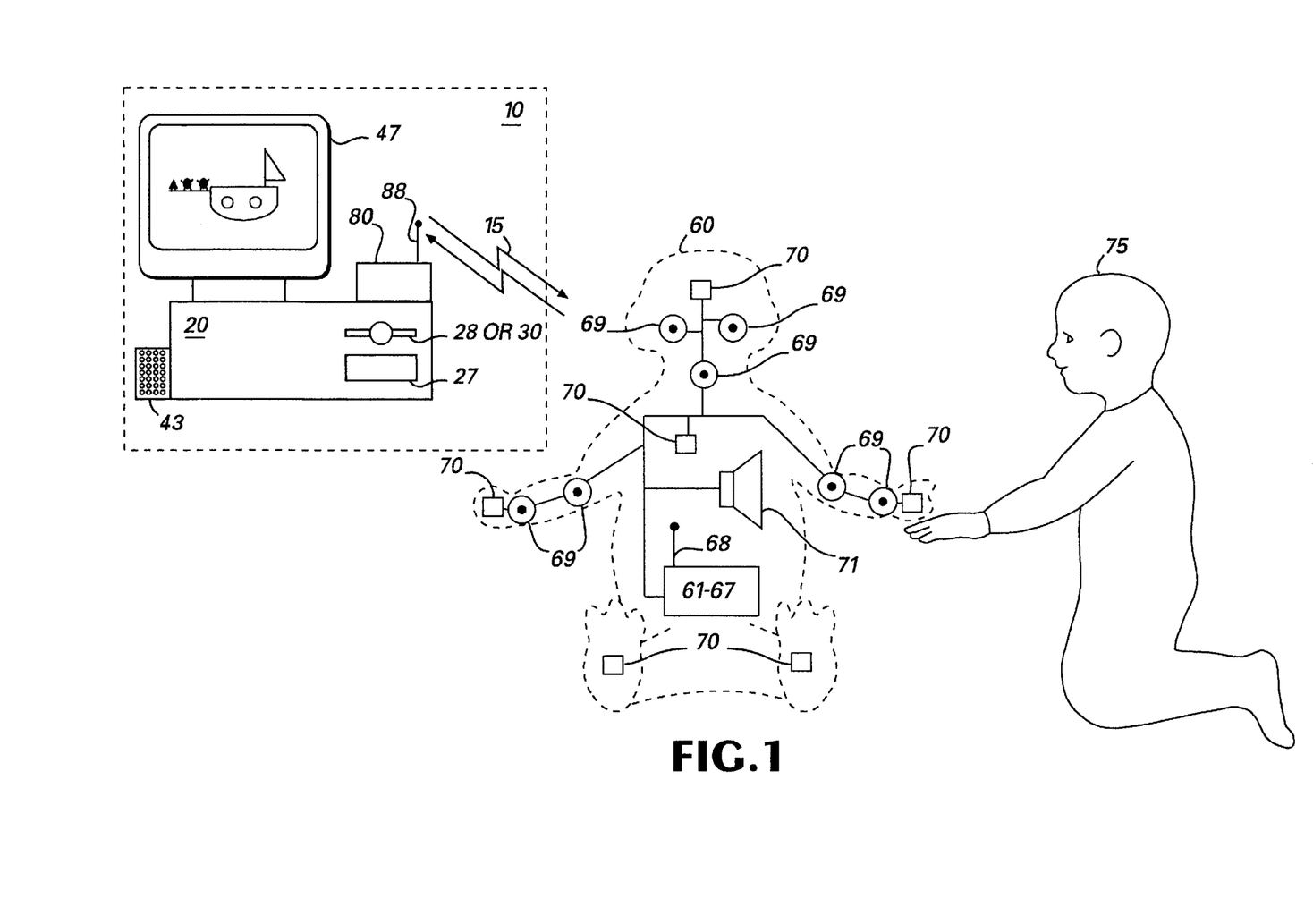
FIG. 1 is a block diagram of a system that includes a personal computer, a wireless modem, and a physical character.

FIG. 1 illustrates an exemplary environment of the present invention. This environment presents a child with an interactive learning setting that includes a control system 10 which controls and interacts with a controlled device, such as a physical character 60. The control system 10 includes a conventional personal computer 20, a wireless modem 80, an antenna 88, a speaker 43, and a display device 47. The personal computer 20 may include a hard disk drive 27, a magnetic disk drive 28, and/or an optical disk drive 30.

During operation, the control system 10 controls an audio/video presentation on the display device 47 and speaker 43. In addition, the control system 10 transmits program data to the physical character 60. The program data contains control data and speech data for controlling the operation of the physical character 60. The process of transmitting the program data includes encoding the program data, modulating a carrier with the encoded program data, and emitting the modulated carrier as an RF signal from antenna 88 over RF communication channel 15.

The physical character 60 receives the RF signals from the control system at antenna 68. The receiver system 61-67 processes the received RF signals to recover the program data. The physical character 60 interprets the received program data and responds to the program data by controlling the operation of one or more servo motors 69 embodied within the physical character 60 and/or by providing speech data to be audibly presented on speaker 71. Thus, transmitting the appropriate program data to the physical character 60 causes the physical character 60 to move and talk as though it is an extension of the audio/video presentation.

The physical character 60 also includes light sensors and touch sensors 70. In response to a child touching, squeezing or moving the physical character 60 in an appropriate manner, the light sensors and/or touch sensors 70 within the physical character 60 may generate status information. In response to a command from the control system 10, the physical character 60 may transmit the status information over the RF communication channel 15 to the wireless modem 80 for processing by the control system 10. By receiving and interpreting the status information, the control system 10 can alter the progression of the audio/video presentation in a manner commensurate with the status information.

Figure 2:
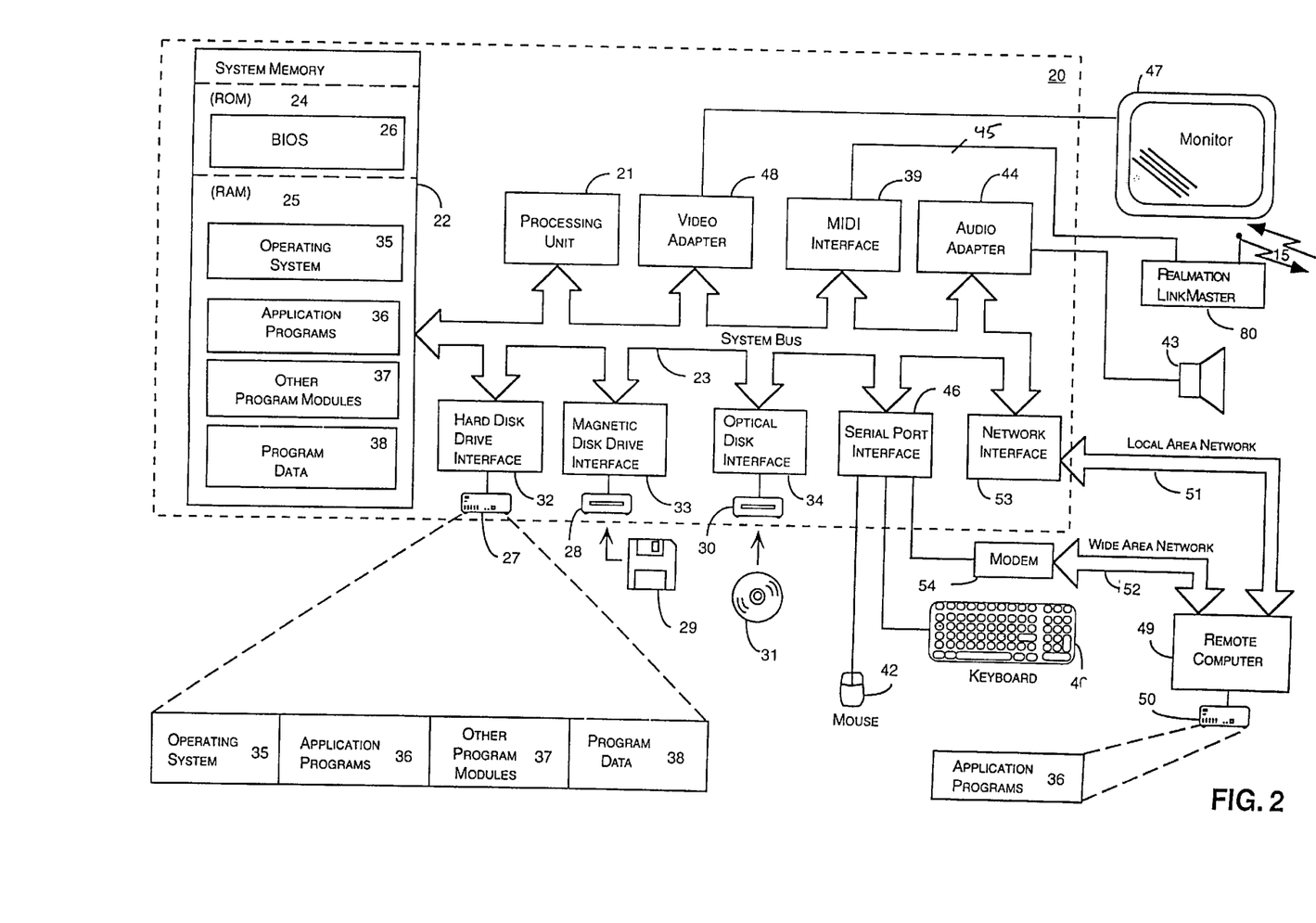
FIG. 2 is a block diagram of the personal computer that forms a part of the system of FIG. 1.

FIG. 2 illustrates, an exemplary system for implementing the control system 10 of the duplex embodiment. The exemplary system includes a conventional personal computer 20, including a processing unit 21, system memory 22, and a system bus 23 that couples the system memory to the processing unit 21. The system memory 22 includes read only memory (ROM) 24 and random access memory (RAM) 25. The ROM 24 provides storage for a basic input/output system 26 (BIOS), containing the basic routines that help to transfer information between elements within the personal computer 20, such as during start-up. The personal computer 20 further includes a hard disk drive 27, a magnetic disk drive 28 for the purpose of reading from or writing to a removable disk 29, and an optical disk drive 30 for the purpose of reading a CD-ROM disk 31 or to read from or write to other optical medium. The hard disk drive 27, magnetic disk drive 28, and optical disk drive 30 interface to the system bus 23 through a hard disk drive interface 32, a magnetic disk drive interface 33, and an optical drive interface 34, respectively. The drives and their associated computer-readable medium provide nonvolatile storage for the personal computer 20. Although the description of computer-readable medium above refers to a hard disk, a removable magnetic disk and a CD-ROM disk, it should be appreciated by those skilled in the art that other types of medium which are readable by a computer, such as magnetic cassettes, flash memory cards, digital video disks, Bernoulli cartridges, and the like, may also be used in the exemplary operating environment.

A number of program modules may be stored in the drives 27–30 and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, track ball, light pen, game pad, scanner, camera, or the like. These and other input devices are often connected to the processing unit 21 through a serial port interface 46 that is coupled to the system bus, but may be connected by other interfaces, such as a game port or a universal serial bus (USB). A computer monitor 47 or other type of display device is also connected to the system bus 23 via an interface, such as a video adapter 48. One or more speakers 43 are connected to the system bus via an interface, such as an audio adapter 44. In addition to the monitor and speakers, personal computers typically include other peripheral output devices (not shown), such a printers and plotters.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. These types of networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In this exemplary embodiment, the personal computer 20 contains a musical instrumentation digital interface ("MIDI") adapter 39 that provides a means for the processing unit 21 to control a variety of MIDI-compatible devices (i.e., electronic keyboards, synthesizers, etc.). The MIDI adapter may also allow the processing unit 21 to control a wireless modem 80. The MIDI adapter operates by receiving data over the system bus 23, formatting the data in accordance with the MIDI protocol, and transmitting the data over a MIDI bus 45. The equipment attached to the MIDI bus will detect the transmission of the MIDI formatted data and determine if the data is to be accepted and processed or ignored. Thus, the wireless modem 80 examines the data on the MIDI bus and processes data that explicitly identifies the wireless modem 80 as the intended recipient. In response to receiving data, the wireless modem 80 may transmit the data over RF communication channel 15.

Figure 3:
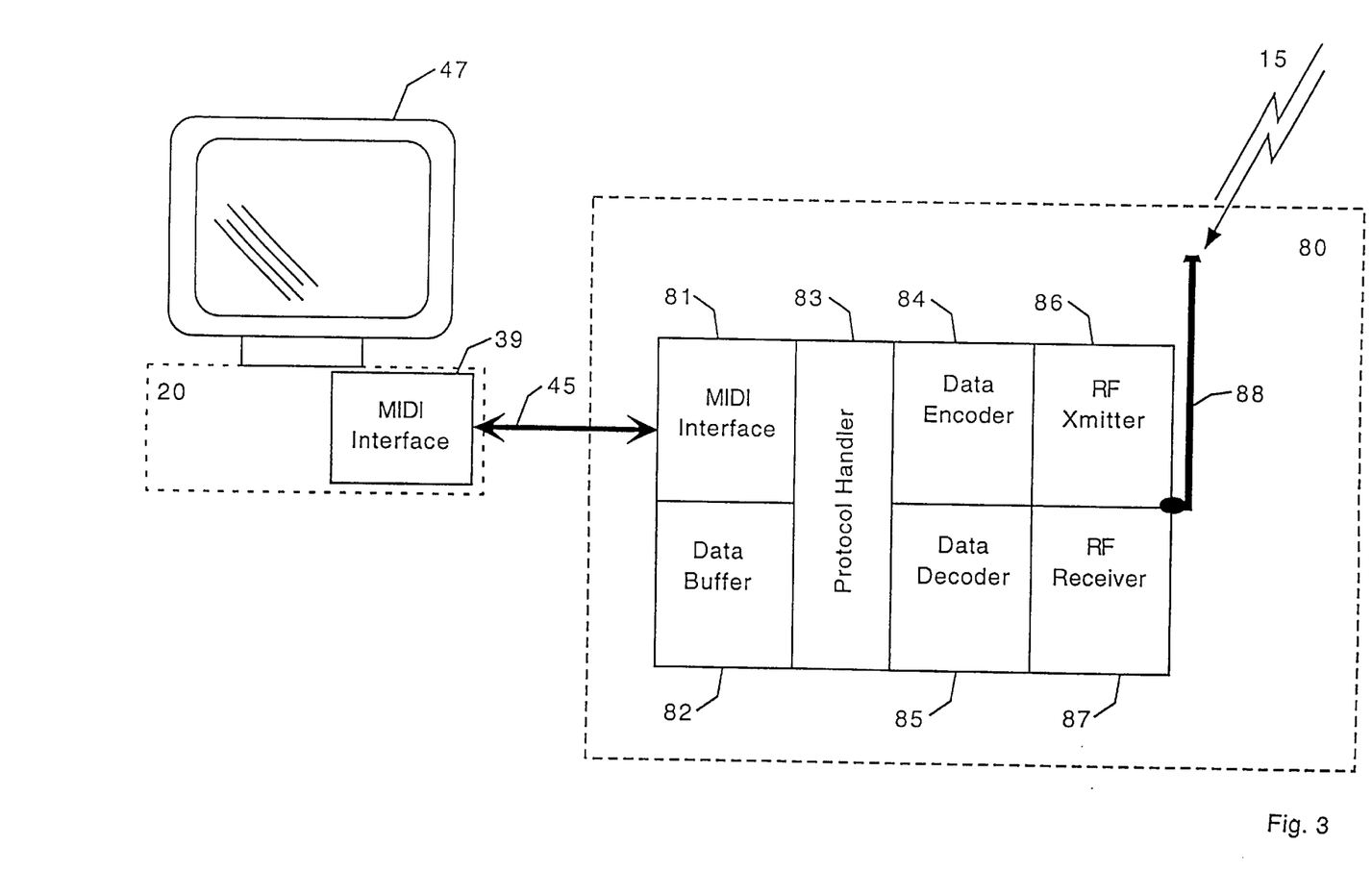
FIG. 3 is a block diagram of a wireless modem that forms a part of the system of FIG. 1.

FIG. 3 is a block diagram illustrating the various components and/or processes that define the wireless modem 80. Initially, a program running on computer 20 obtains program data by generating the data or retrieving the data from a storage medium accessible to computer 20. In addition, the program may format the program data in accordance with a "REALMATION" specific protocol, or in the alternative, the program may retrieve pre-formatted program data from a storage medium. The program transfers the program data to the wireless modem 80 over the MIDI interface including MIDI adapters 39 and 81 and MIDI bus 45. This process includes a repackaging of the program data into the MIDI format. Those skilled in the art will appreciate that the MIDI interface is only one of several possible interfaces that can be used to transfer program data between the computer 20 and the wireless modem 80. Alternative interfaces include, but are not limited to, interfaces such as RS-232, Centronix, and SCSI.

The protocol handler 83 receives the MIDI formatted data from the MIDI adapter 81 and removes the MIDI formatting to recover the program data. During this process, the protocol handler 83 may temporarily store the program data and or the MIDI formatted data in data buffer 82. The protocol handler 83 may also perform other manipulations on the program data in preparation for transmitting the data. Before transmitting the program data, the data encoder process 84 encodes the program data and provides the encoded program data to the RF transmitter 86. The RF transmitter uses the encoded program data to modulate a carrier and then transmits the modulated carrier over RF communications channel 15 from antenna 88.

The wireless modem 80 may also receive signals carrying character data and originating from one or more physical characters 60 or other devices. The wireless modem 80 detects these signals at antenna 88 and provides the signals to the RF receiver 87. The RF receiver 87 demodulates the received signals, recovers encoded character data and provides the encoded character data to the data decoder process 85. The data decoder process 85 decodes the encoded character data and provides decoded character data to the protocol handler 83. The protocol handler 83 packages the decoded character data into the MIDI format and transfers the MIDI formatted data to computer 20 through MIDI interface 81. The protocol handler 83 and or the MIDI interface 81 may temporarily store the character data in data buffer 82 during processing.

Upon receiving the information at the MIDI Interface 39, the computer 20 recovers the character data from the MIDI formatted data and then processes the character data.

THE PHYSICAL CHARACTER

Figure 4:
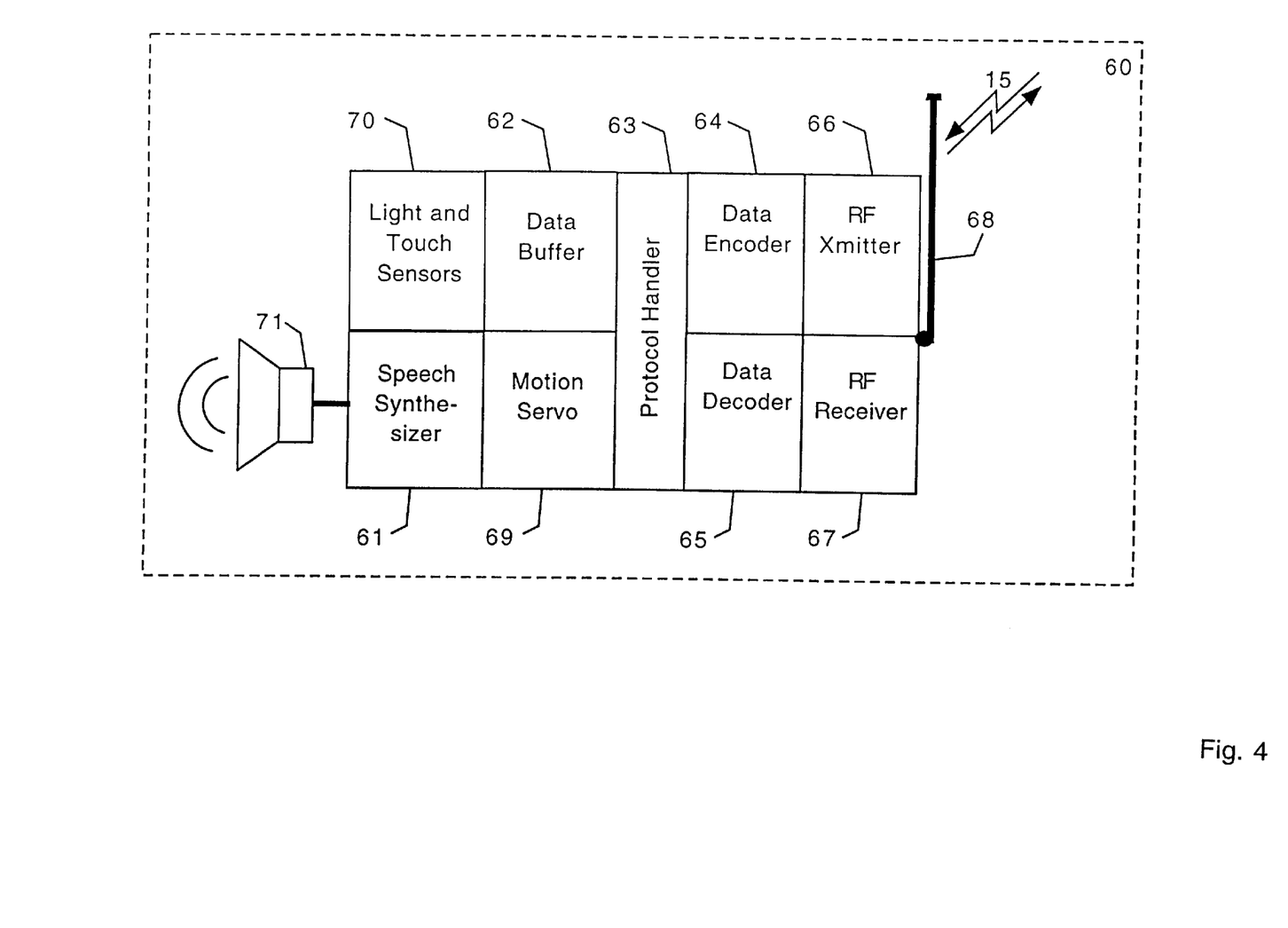
FIG. 4 is a block diagram of various components of the physical character of FIG. 1.

FIG. 4 is a functional block diagram illustrating the various components and/or processes that define a physical character 60. Each of these components may be implemented in hardware, software or a combination of both. Generally, the physical character includes a microprocessor or other processing unit for retrieving a program from ROM, or some other non-volatile storage medium, and executing the instructions of the program. In addition, the physical character 60 includes hardware components such as an RF radio receiver 67 and possibly a transmitter 66, an antenna 68, a readable and writable storage memory 62, sensors 70, servo motors 69, a speech synthesizer 61, and a speaker 71.

The RF receiver 67 receives detected signals from the antenna 68. The RF receiver operates on the received signal by demodulating the carrier and recovering encoded program data. Next, the data decoder 65 receives and decodes the encoded program data. The protocol handler 63 receives the decoded program data output from the decoder 65 and interprets the program data. Based on the content of the program data, the program sends control signals and/or speech data to the appropriate devices. Thus, if the program data contains control information, one or more of the motion servo motors 69 will receive control signals causing them to be actuated. Furthermore, if the program data contains speech data, the speech synthesizer 61 will receive the speech data, convert the speech data into audio signals, and then provide the audio signals to the speaker 71. The program data may be temporarily stored in data buffer 62 while various processes are being performed.

The physical character 60 may also include light sensors and touch sensors 70. The sensors 70 may generate status information in response to variations in pressure, light, temperature or other parameters. The physical character 60 may transmit this status information or character data to the control system 10 (shown in FIG. 1). This process includes formatting the status information in protocol handler 63, encoding in the status information in data encoder process 64, modulating a carrier with the encoded status information in RF transmitter 66, and then transmitting the modulated carrier over RF communications path 15 through antenna 68.

A description of the communication protocols and signaling formats used in an exemplary embodiment are described in copending U.S. application Ser. No. 08/794,921 entitled "A SYSTEM AND METHOD FOR CONTROLLING A REMOTE DEVICE" filed on Feb. 4, 1997; and U.S. application Ser. No. 08/795,710, entitled "PROTOCOL FOR A WIRELESS CONTROL SYSTEM" filed on Feb. 4, 1997; which are assigned to a common assignee and incorporated herein by reference.

SUBSTITUTING AN ANIMATED CHARACTER FOR A MISSING PHYSICAL CHARACTER

The present invention can automatically substitute a representation of a controlled device on a display device when the controlled device is not available. In the context of the "REALMATION" product, the present invention can substitute an animated character (i.e., a representation of a physical character) on a display device when a physical character (i.e., the controlled device) is not available. This allows the educational software to be used effectively regardless of whether the physical character is available.

Figure 5A:
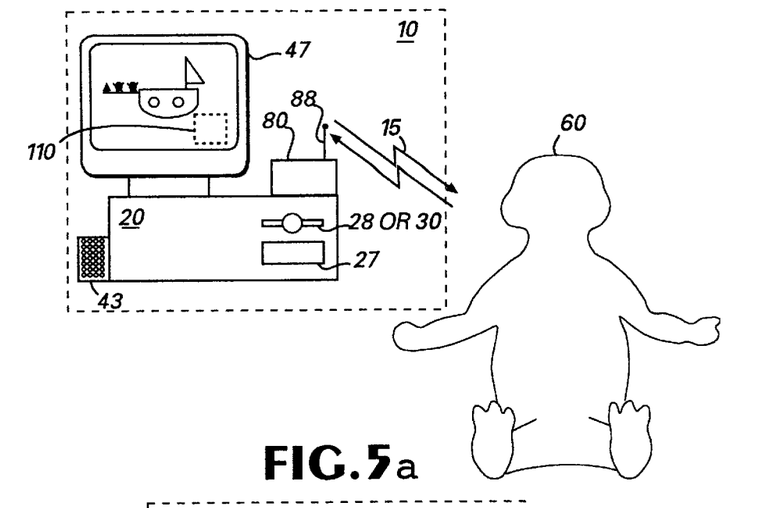
Figure 5B:
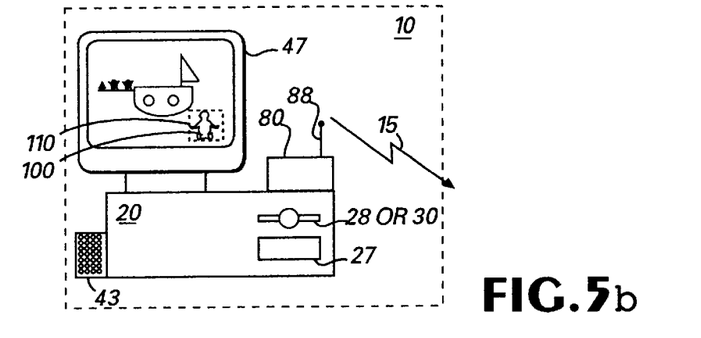
Figure 5C:
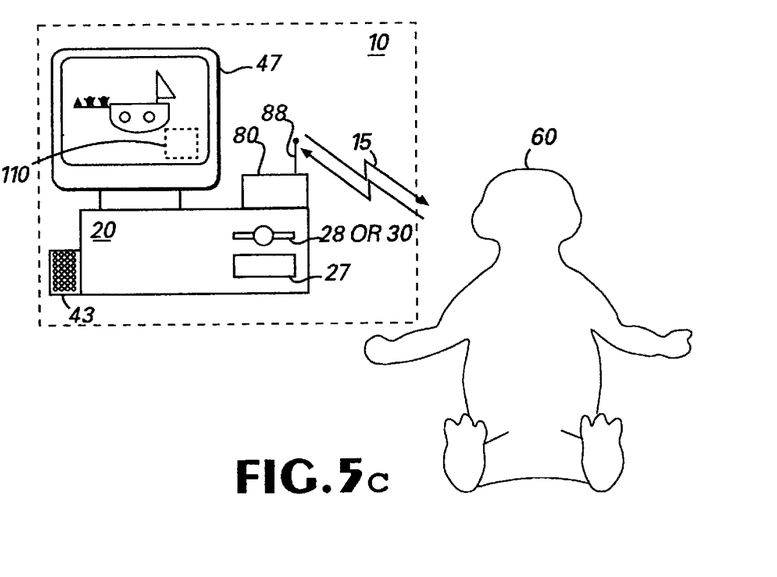

FIGS. 5a, 5b, and 5c illustrate the substitution of the animated character. In FIG. 5a, the physical character 60 is available (i.e., turned on and in communication range), and is communicating with the control system 10. Thus, in FIG. 5a, the control system 10 displays the content of the educational program on the display device and sends the program data (i.e., corresponding speech and motion signals) to the physical character 60.

The transmitted program data is coordinated with the displayed content so that when the physical character speaks or moves in response to the program data, it appears that the physical character 60 is interacting with the user and with the characters or content on the display device. By functioning in this manner, the physical character can provide guidance and encouragement to the young user as he or she uses the application/content program.

In FIG. 5b, the physical character has become unavailable during the program. The control system 10 determines that the physical character is unavailable because the physical character 60 no longer sends data (e.g., status or sensor data) back to the control system 10. This will occur if the physical character 60 is moved out of range or turned off, or if its batteries die.

When the physical character "disappears," the control system 10 automatically substitutes an animated character 100 on the display device 47 to provide an animated representation of the physical character. By varying the appearance of the animated character 100 and playing the appropriate audio files, the animated character 100 moves and speaks in a manner that is substantially similar to the physical character 60. When the animated character 100 speaks or moves in response to the stored audio and video signals, it appears that the physical character 60 is interacting with the user and with the characters on the display device 47, and provides guidance and encouragement to the young user. Thus, the program is useful and the interaction complete in spite of the unavailability of the physical character. Alternatively, the displayed representation of the physical character can be a static image, which would serve as a visual indication to the user that the physical character is unavailable.

While the control system 10 is displaying the animated character, it periodically checks for the presence of the physical character. If the physical character 60 returns and is acquired by the control system 10, the animated character disappears from the display device 47 and the physical character begins to speak and move as it did before. This is illustrated in FIG. 5c.

Those skilled in the art will appreciate that the substitution of the animated character for the physical character is automatic and occurs quickly, thereby allowing the child to continue to use the program without interruption.

Those skilled in the art will also appreciate that the video programming displayed on the display device must be designed so that it provides an appropriate space for the animated character. The space (e.g., the lower right corner of the displayed area) is preferably free of other clutter and allows the animated character to be superimposed on the normal video content without obscuring or interfering with the appearance of other objects. A exemplary reserved area 110 is indicated in FIGS. 5a, 5b, and 5c.

Figure 6:
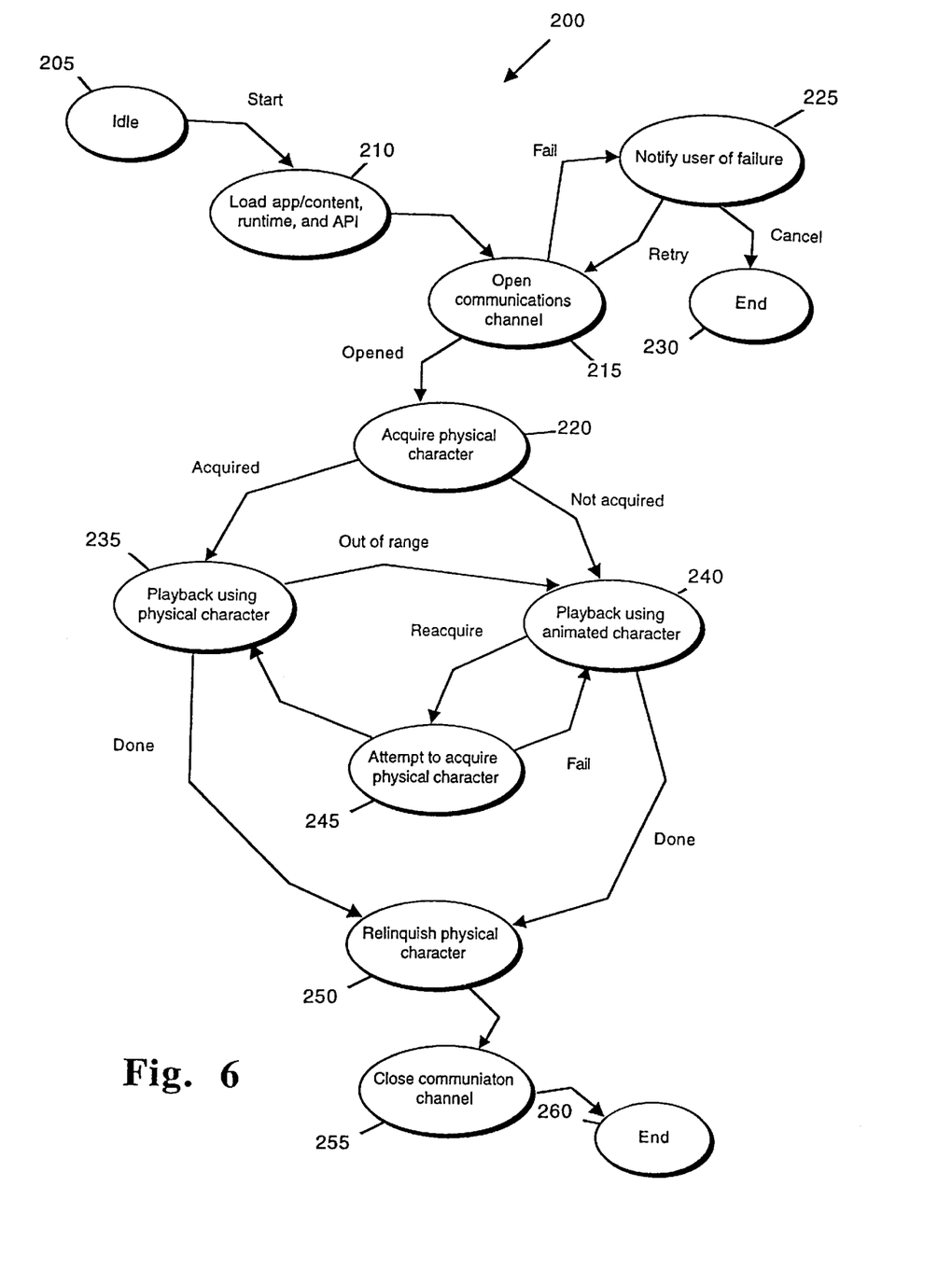
FIG. 6 is a state diagram illustrating a method for substituting the animated character for the physical character in accordance with an exemplary embodiment of the present invention.

FIG. 6 is a state diagram of an exemplary method 200 of switching between animated and physical characters. Before describing the specific steps of the method 200 it is useful to describe the operation in general terms. Those skilled in the art will appreciate that the software employed in the system includes an application/content program and runtime support software. The runtime support software is a separate process that controls the interface between the computer and the wireless modem, and handles the formatting of signals transferred between the computer and the wireless modem. Interprocess communication between the application/content program and the runtime support software is facilitated by an application programming interface (API) or other interprocess communication facility.

The interaction between the application/content program and the runtime support software is broken into several steps. As part of the application/content program's initialization, the program instructs the runtime support software to open a communication channel to a physical character. When the application/content software is ready to communicate with the device, it instructs the runtime support software to acquire the device and specifies a specific logical subchannel for communication with the device. Once the physical character is acquired, the application/content software loads a performance file from the storage medium. The application/content software decodes the file, and writes it to the runtime support software, which transmits the data to the physical character in order for the physical character to talk and move. The runtime support software also provides messages to the application/content program in order notify the program of any sensor data received from the physical character, or if the physical character becomes unavailable. When the application/content program is finished communicating with the physical character, it instructs the runtime support software to release the physical character.

Referring to the state diagram of FIG. 6, the method 200 begins in the idle state 205. When the user invokes the application program, the method proceeds to state 210, where it loads the application/content software and the runtime software. Once these program modules are loaded, the method proceeds to state 215.

At state 215 the application/content software attempts to open a communication channel to one or more physical characters. This involves checking various hardware devices, including the sound card, communication port, and wireless modem. In an exemplary embodiment, the application/content program initiates this by instructing the runtime support software to open the communication channel. If the communication channel was opened successfully, the method proceeds to step 220.

If, for some reason the computer is unable to open the communication channel, the method proceeds to state 225 and informs the user that the hardware is not working properly or is not properly connected. The application/content program may include information to assist the user in diagnosing and correcting the problem. Based on input from the user, the method 200 will terminate the program (state 230) or return to state 215 and make another attempt to open the communication channel.

After the communication channel is opened, the method 200 proceeds to state 220, where the application/content program instructs the runtime support software to "acquire" a specific type of physical character. The application/content software provides various parameters such as the type of device to be acquired and the logical subchannel that will be used to communicate with the device. If the physical character is acquired, the method proceeds to state 235. If the physical character is not acquired, the method proceeds to state 240.

At state 235, the application/content software plays the program content and transmits voice and motion signals to the physical character. This is accomplished by retrieving both program content data and physical character data from a storage device, such as a CD-ROM. The program content data is used to display images on the computer's display device and to provide audio via speakers connected to the computer. The physical character data, which includes motion data and LPC encoded speech, is transmitted to the physical character. The physical character data includes words, phrases, movements, etc. that are associated with the material being displayed on the computer's display device. This allows the physical character to interact with the user and with the other characters on the display device.

Those skilled in the art will appreciate that the program content and the physical and animated character data can be stored in a variety of ways. For example, the storage medium may include separate files containing the physical character data (including motion data and encoded speech data) and animated character data (including audio files and bitmap images). In this case, the application/content program will read from one file or the other depending on which character is being used. Alternatively, the movement and speech data can be incorporated in a single file, which is interpreted at run time to provide physical character data or animated character data.

At state 240, the application/content software has determined that the physical character is not available, and will proceed to play the progran content using an animated characters in place of the physical character. This is accomplished by retrieving both program content data and animated character data from a storage device, such as a CD-ROM. The program content data is used to display images on the computer's display device and to provide audio via speakers connected to the computer. The animated character data, which includes, for example, bit mapped images and associated audio, is used to display the animated character on the display device. This allows the substitute animated character to interact with the user and with the other characters on the display device.

While the application/content program is using the animated character, it will periodically check to see if the physical character has become available (e.g., it has been brought back into the room, turned on, etc.). This is accomplished by going to state 245 and instructing the runtime support program to attempt to acquire the physical character. This is done in the same manner described in conjunction with state 220. If the physical character is not acquired, the method returns to state 240 and continues to use the animated character. If the physical character is acquired, the method 200 proceeds to state 235 and quits using the animated character. At this point, the physical character is activated and the animated character is no longer needed.

If, while the application/content program is using the physical character (state 235), the runtime support program sends a message indicating that the physical character is no longer available, the method 200 proceeds to state 240 and substitutes the animated character for the unavailable physical characters. Those skilled in the art will appreciate that, in an exemplary embodiment, the runtime support program expects to receive sensor data from the physical character from time to time. If the data is not received, the runtime support program eventually determines that the physical characters is out of range or inoperative, and send an "out of range" message to the application/content software.

When the application/content program is finished, the method 200 proceeds to state 250 (from state 235 or state 240). At this point, the application/content software relinquishes or "de-acquires" the physical character. The method then proceeds to step 255 where the program closes the communication channel. At that point, the method 200 terminates (state 260).

SUMMARY OF THE DETAILED DESCRIPTION

From the foregoing description, it will be appreciated that the present invention provides an improved system and method for employing both physical, remote control characters and substitute animated characters in conjunction with educational programs and other types of software. The physical character interacts with the user and the characters being displayed on the display device in order to provide guidance and encouragement to the user. If the physical character is unavailable for some reason, an animated character is substituted. By providing the animated character, the present invention ensures that the application/content software is useful and that the user's experience will be satisfactory even if the physical character is unavailable. The animated character is useful because substitution is automatic, and does not require any input from the user.

The foregoing system may conveniently be implemented in one or more program modules that are based upon the state diagram of FIG. 6. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. In a system including a computer, a display device and a controlled device that responds to signals from the computer, a method for replacing a controlled device with a representation of the controlled device, comprising the steps of:

determining whether the controlled device is available;

in response to the controlled device being available, transmitting controlled device data to the controlled device; and in response to the controlled device not being available, retrieving representation data and displaying a representation of the controlled device on the display device, wherein the transmitted controlled device data and the retrieved representation data are coordinated with the program content being displayed on the display device.

2. The method recited in claim 1, further comprising the steps of:

while transmitting the controlled device data to the controlled device, receiving an indication that the controlled device is no longer available; and in response to the controlled device being no longer available, retrieving representation data and displaying a representation of the controlled device on the display device.

3. The method recited in claim 2, wherein the indication that the controlled device is no longer available is provided in response to the controlled device failing to provide data to the computer.

4. The method recited in claim 1, further comprising the steps of:

while displaying the representation of the controlled device on the display device, receiving an indication that the controlled device is available; and in response to the controlled device being available, terminating the display of the representation of the controlled device and transmitting controlled device data to the controlled device.

5. The method recited in claim 4, wherein the indication that the controlled device is available is provided in response to a successful attempt to acquire the controlled device.

6. The method recited in claim 1, wherein determining whether the controlled device is available comprises:

attempting to acquire the controlled device; and receiving a response from the controlled device.

7. The method recited in claim 1, wherein the controlled device comprises an animated physical character and the representation of the controlled device comprises a representation of the physical character.

8. A computer storage medium storing computer-executable instructions for performing the method of claim 1.

9. A computer-controlled apparatus configured to perform the method of claim 1.

10. A computer system for displaying an animated character in the place of a physical character, comprising:

a physical character;

a processing unit;

a wireless modem connecting the physical character to the processing unit;

a display device connected to the processing unit for displaying images;

memory connected to the processing unit and containing a program module;

a storage medium connected to the processing unit for storing content to be displayed on the display device, physical character data, and animated character data;

the processing unit, responsive to instructions from the program module, being operative to:

acquire a physical character;

display the content on the display device;

retrieve the physical character data from the storage medium;

transmit the physical character data to the physical character;

receive an indication that the physical character is not available; and in response to the indication that the physical character is not available, retrieve animated character data from the storage medium and display the animated character on the display device, wherein the retrieved portions of the physical character data and the animated character data are coordinated with a portion of the content being displayed on the display device.

11. The computer system recited in claim 10, wherein the indication that the physical character is no longer available is provided in response to the physical character failing to provide data to the computer.

12. The computer system recited in claim 10, wherein the processing unit is further operative to:

while displaying the animated character on the display device, receive an indication that the physical character is available; and in response to the physical character being available, terminate the display of the animated character and transmit at least a portion of the physical character data to the physical character.

13. A computer-readable medium having computer-executable instructions for performing steps comprising:

retrieving content to be displayed on a display device;

determining whether a physical character is available; and in response to the physical character not being available, retrieving animated character data and displaying an animated character on the display device, wherein the animated character data is coordinated with the retrieved content.

14. The computer-readable medium recited in claim 13, further comprising computer-executable instructions for:

receiving an indication that the physical character is available; and in response to the indication, terminating the animated character;

retrieving physical character data; and transmitting the physical character data to the physical character, wherein the physical character data corresponds to the retrieved content.

15. The computer-readable medium recited in claim 14, wherein the indication that the physical character is available is provided in response to a successful attempt to acquire the physical character.

16. The computer-readable medium recited in claim 13, wherein determining whether the physical character is available comprises:

attempting to acquire the physical character; and receiving a response from the physical character.

* * * * *